Sept. 11, 1956 W. G. CADY 2,762,447
CAVITY RADIOMETER
Filed Jan. 16, 1951

INVENTOR.
WALTER G. CADY
BY
Roderick B. Jones
ATTORNEYS

United States Patent Office 2,762,447
Patented Sept. 11, 1956

2,762,447

CAVITY RADIOMETER

Walter G. Cady, Middletown, Conn., assignor to the United States of America as represented by the Secretary of the Navy Application January 16, 1951, Serial No. 206,185

9 Claims. (Cl. 181—.5)

This invention pertains to the science of sound, and comprises apparatus for measuring wave energy of sound, and more particularly to such apparatus wherein measurement of acoustic radiation pressure is made, from which measurement the acoustic power delivered by a generator is derived readily and the efficiency value computed.

Heretofore, radiation pressure measurements have been made by means of conventional types of vane radiometers of which the limits of accuracy are set by the ponderomotive body force exerted on the medium traversed by the radiation resulting in unilateral drift of the medium. These limitations have been reduced somewhat by the employment of thin membranes disposed in front of the radiometer vanes, but, in the absence of perfectly transmitting membranes, further complications and errors arising from multiple reflections between the vanes and respective membranes are introduced thereby.

Accordingly, it is a principal object of this invention generally to improve the art of radiation-pressure-measuring apparatus.

Another object is to provide a new and improved radiometer apparatus.

Yet another object is to provide novel radiometer apparatus that is not subject to restrictions or limitations resulting from ponderomotive forces on the medium traversed by the radiation.

In accordance with the principles of this invention, a radiometer in the form of a tubular cavity closed at one end, and having, at the other end, a thin accoustically transparent membrane or plate of known transmission, hereinafter called the tube window, is provided which can be suspended in an acoustic medium where it is subjected to a substantially axial displacement by acoustic radiation received within the cavity from a source positioned adjacent to the tube window. Means are provided for measuring the force exerted on the tube, and the total acoustic power delivered by the source can be calculated readily therefrom.

By the present cavity type of radiometer, all of the radiation from the source and all the body force on the medium located between the source and the tube window, act jointly upon the tube, and are thus accounted for in the determination of the force on the tube. Accordingly, the hereinabove discussed disadvantages, inherent in the prior-known devices, are substantially eliminated.

It is, therefore, a further object of the invention to provide a novel cavity radiometer adapted to receive the total energy radiated by a generator of wave energy and including means to measure a change of condition of said radiometer in response to the received energy.

The radiometer of this invention is useable with highly collimated beams of wave energy wherein substantially all the radiated energy is trapped within the tubular cavity as well as the divergent beams. In the latter case, the radiating surface of the source of wave energy can be rotated relative the axis of the tubular cavity and the relative amounts of energy radiated in the respective angular directions can be determined. In this manner the directivity characteristics of a transducer, for example, can be determined.

Still another object, therefore, is to provide a novel means for measuring the angular spatial distribution of energy radiated by a source of wave energy.

Other objects and many of the attendant advantages of this invention will be readily appreciated as the same becomes better understood by reference to the following detailed description when considered in connection with the accompanying drawings wherein.

Figure 1:
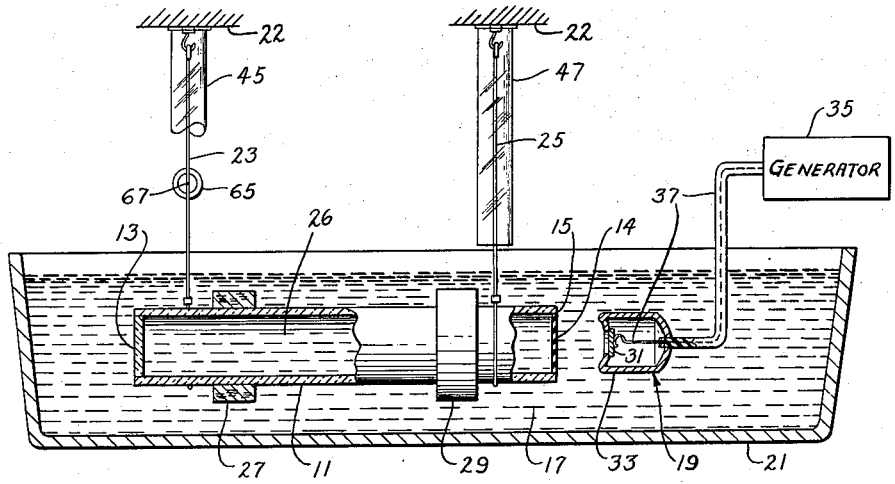
Fig. 1 is a schematic diagram, partly in block diagrammatic form, of a preferred embodiment of the invention.

As shown in Fig. 1, a cavity radiometer constructed in accordance with the teaching of this invention comprises an elongated tube 11, having a straight-line axis and uniform cross-section throughout its length. Base 13 closes one end of tube 11 and is disposed normal to the axis thereof, the other end 15 of the tube being open. Sound transparent window 14 closes the open end 15 of tube 11 fluid-tight, constitutes a thin membrane or plate of known transmission, and is disposed normal to the axis of the tube. A suitable sound-transmission liquid 26 inside tube 11 is confined therein by window 14. Tube 11 is suspended in any fluid medium 17 with its window 14 positioned near and adjacent to a source of sound 19. The medium 17 can be any suitable liquid contained in tank 21. In principle, the tube can also be suspended in air or other gas, if desired.

Tube 11 need not necessarily have the form of a circular cylinder, but may be an elongated cavity of any cross-sectional shape. The suspended system should be as light as possible. Hence, it is usually most convenient to fabricate the tube of rather thin-walled glass or suitable plastic material.

A support for tube 11 comprises a rigid foundation or base 22 positioned above tube 11, to which one or more long vertical fibers or wires 23 and 25 are secured to hang down, as shown. Tube 11 is secured to the lowermost ends of flexible strands 23 and 25, whereby the tube is suspended pendulously submerged in liquid 17 of container or tank 21. In order to make the radiometer sufficiently sensitive to feeble radiation pressures from the source 19, tube 11 can be buoyed up to any desired extent by buoying devices 27 and 29, attached to or surrounding the tube, and supporting all but a diminutive portion of the total weight of tube 11 with its window 14 containing a liquid. Buoyancy devices 27 and 29 can be especially designed air pockets, or water-proofed corks, or other expedients. Alternatively, the source of sound 19 in Fig. 1 can, for example, be a quartz-crystal transducer, comprising a crystal plate 31 mounted in a cartridge 33 and adapted to be driven by high-frequency current from a suitable conventional generator 35 through a transmission cable 37. When transducer 31 is positioned near and adjacent to window 14, with tube 11 and the transducer in coaxial alignment, sound waves through window 14 are directed into tube 11 to travel in the liquid 26 thereof along its axis.

It is to be understood that the radiometer of this invention is not at all limited to use with crystal transducers, as herein described, it being clear that other sources, as for example, magnetostrictive devices or other types can be employed for supplying radiation of sound to be studied.

A convenient frequency of operation used in experiments conducted with the device of this invention has been 15 megacycles/second. At this frequency, the beam radiated from source 19 is very narrow, the waves are essentially plane, and the cross section remains nearly constant throughout the length of the tubular element 11. With most liquids the absorption of energy is so great that the radiation at the remote end of the tube, even if the tube length is only about 12 centimeters, is reduced to a small fraction of its value at the source, and any energy reflected back to the opening is quite negligible in amount.

Figure 2:
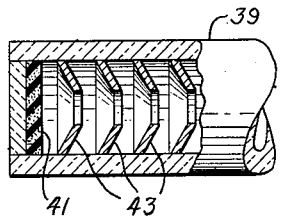
Fig. 2 is a fragmentary view of a modified form of tubular element.

For operation with shorter tubular elements, or media of lower absorption, or at frequencies of operation so low that the amount of reflected energy might be considerable, I provide a tube 39 (Fig. 2) in which the escape of reflected energy can be prevented by a coating 41 secured to the inside of base 13 of the tube. Coating 41 may constitute any sound-absorbing material. In addition, tube 11 may be provided with a system of baffles 43 secured to the inside wall of the tube to scatter the waves in random directions therewithin.

To minimize disturbance of the suspended system by wind or air currents, suitable glass or other tubes 45, 47 are supported by base 22 to contain respective strands 23, 25.

In operation, tube 11 is suspended horizontally, with its window 14 near and adjacent to the source 19 of sound. A beam of acoustic energy from the transducer 31 is directed at window 14 along the axis of tube 11. The acoustic energy is substantially completely trapped. That part of the energy that is not absorbed by the liquid medium in tube 11 produces a radiation pressure tending to move the tube lengthwise in a direction away from the source. That part which is absorbed gives rise, as is well known, to a body force acting on the medium and tending to move tube 11 in the direction of its axis. Owing to these two causes, the tube will swing pendulously on strands 23 and 25 in the direction away from the source of sound 19, coming to rest in an equilibrium position such that the suspensions 23 and 25 are deflected from the vertical by a certain amount. The magnitude of the deflection can be observed by means of a micrometer microscope 65 focused on some point 67 on one of the suspensions at a predetermined position along its length. From the geometry of the system and the various masses, the resultant force on the tube 11 is then calculated. This force is exactly the same as the radiation pressure at the source.

It has been found that instead of calculating the force from the observed deflection of the tube, it is preferable to use a null method, whereby the arm of a calibrated torsion balance is caused to push the tube back to its initial position.

Figure 3:
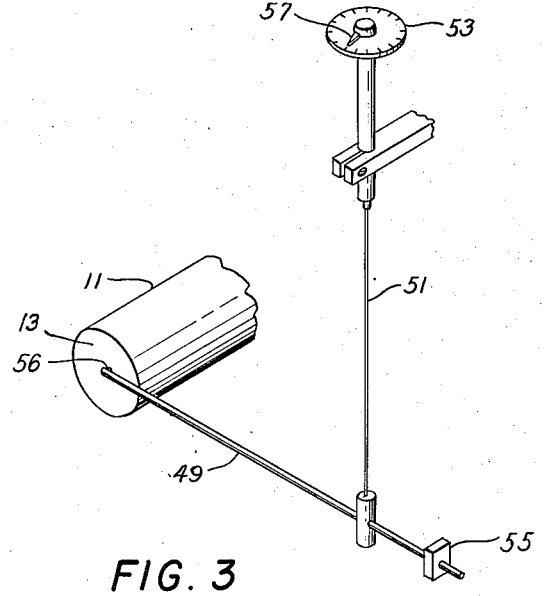
Fig. 3 is a fragmentary enlarged perspective view of a modified form of force-measuring apparatus.

The torsion balance is shown in Fig. 3 and comprises a horizontal arm 49 suspended in any suitable manner from a fine fiber or strand 51, which can be of quartz. A torsion head 53 is graduated in degrees. One end of the arm 49 carries an adjustable counterbalance 55 while the other end is turned or bent at 90°, to constitute an abutment finger 56, which bears against the base 13 of the tube 11 at its axis. Dial 53 and indicator 57 constitute a rotor and stator rotatable relative to each other, of which strand 51 constitutes the shaft of the rotor. When tubular element 11 is displaced under the influence of radiation pressure from the transducer, the torsion balance exerts a restorative force against tube 11, pushing it back to its initial position. The torsion balance can readily be calibrated so that the amount of relative rotation between indicator 57 and dial 53 can be converted directly into dynes of force.

If A denotes the radiating area of the crystal in square centimeters, F the force on the tube in dynes, S the radiation pressure at the source in dynes per square centimeter, c the velocity of sound in the medium in centimeters per second, J the acoustic intensity at the source in ergs per second per square centimeter and P the radiated power, we have, from well-known formulas:

$$S = \frac{F}{A} = \frac{J}{c}$$

$$P = JA = Fc \text{ dynes cm.}^{-2} \text{ sec.}^{-1}$$

Whence the power is $$JA \times 10^{-7} \text{ watt}$$

It is found experimentally that the tube should be sufficiently wide for the body force acting upon the beam to produce a free circulation of liquid inside the tube.

The cavity radiometer hereinabove described can be used for exploring the output from a transducer of which the area of the radiating face is too great for the entire beam to enter the tube. In this case the tube can be used to sample different parts of the beam. Used in this way the tube will also serve to measure the intensity of radiation in various portions of a diverging beam.

It is also possible to use the cavity radiometer for measuring the coefficient of absorption of sound in a medium. Measurements are made with the tube at two or more distances from the source. In each case a thin diagram, fixed in space, is placed in front of the tube window, to insure that the only force on the tube shall be due to radiation. From a comparison of the forces at different distances the absorption can be calculated by the use of well-known formulas.

Obviously many modifications and variations of the present invention are possible in the light of the above teachings. It is therefore to be understood that within the scope of the appended claims the invention may be practiced otherwise than as specifically described.

What I claim is:

1. In apparatus for measuring sound from a source in a fluid medium that transmits sound, a rigid tube having a straight-line axis and a uniform cross-section throughout its length, the tube comprising a rigid base closing its one end and its opposite end being open, an acoustically-transparent window closing the open end of the tube, a sound-transmitting liquid in the tube confined therein by the window, a support suspending the tube horizontally and movably in the fluid medium located with the window near the source of sound in the path of sound waves and with the tube extending in the direction away from the sound source; and a measuring device operable to measure physical displacement of the tube lengthwise of its axis in the sound-transmitting fluid medium.

2. In apparatus as defined in claim 1, the support for the tube comprising a rigid foundation above the tube and a flexible strand extending from the foundation to the tube and supporting the tube pendulously.

3. In apparatus as defined in claim 2, the measuring device comprising a micrometer microscope positioned to indicate displacement of the strand at a predetermined point along its length.

4. In apparatus as defined in claim 2 the measuring device comprising a torsional balance embodying a relatively rotatable element comprising a rotor and stator, a shaft carrying the rotor extending vertical to a position opposite the base of the tube, an arm secured to the shaft and projecting horizontally therefrom to a position adjacent to the tube base, and an abutment finger projecting laterally from the arm into engagement with the base at the axis of the tube.

5. In apparatus as defined in claim 1, a sound-absorbent material covering the face of the base on the inside of the tube.

6. In apparatus as defined in claim 5, baffles secured to the inside wall of the tube at intervals along its length to scatter waves in random directions laterally of the axis of the tube.

7. In apparatus for studying sound characteristics, a source of sound and a rigid tube having a straight-line axis and a uniform cross-section throughout its length, the tube comprising a rigid base disposed normal to the axis of the tube and closing its one end, the opposite end of the tube being open, an acoustically-transparent window closing the open end of the tube and extending normal to the axis thereof, a sound-transmitting liquid in the tube confined therein by the window, a second sound-transmitting liquid and a container therefor, a support suspending the tube submerged and movable horizontally in the liquid of the container, the source of sound comprising a sound transducer submerged in the liquid of the container near and adjacent to the window, a generator supplying power to the transducer, the transducer emitting sound waves towards the window substantially coaxially with the tube, and a measuring device operable to measure physical displacement of the tube lengthwise of its axis in the liquid of the container.

8. In apparatus as defined in claim 7, the support for the tube comprising a rigid foundation above the container and a flexible strand extending from the foundation to the tube and supporting the tube pendulously in the liquid of the container.

9. In apparatus as defined in claim 8, the support additionally comprising a buoyancy device secured to the tube to support all but a predetermined portion of the weight of the tube and its liquid.

References Cited in the file of this patent

UNITED STATES PATENTS

| | | |
|---|---|---|
| 1,249,484 | Pogue | Dec. 11, 1917 |
| 2,394,461 | Mason | Feb. 5, 1946 |
| 2,418,964 | Arenberg | Apr. 15, 1947 |
| 2,483,768 | Hershberger | Oct. 4, 1949 |
| 2,503,400 | Mason | Apr. 11, 1950 |
| 2,507,770 | Claassen | May 16, 1950 |
| 2,532,507 | Meunier | Dec. 5, 1950 |
| 2,625,615 | Webb | Jan. 13, 1953 |

OTHER REFERENCES

Richardson: "Sound," Longmans, Green & Co., New York, 1927, pp. 210–212, 218–220, QC 225. R5.

Wood: "Sound," G. Bell & Sons, Ltd., London, 1941, pp. 470–471, QC 225. W6.